United States Patent [19]

Nöthe

[11] 4,098,926
[45] Jul. 4, 1978

[54] METHOD OF PRODUCING OPTICAL CABLES

[75] Inventor: Björn Nöthe, Ebersberg, Fed. Rep. of Germany

[73] Assignee: Siemens Aktiengesellschaft, Berlin & Munich, Germany

[21] Appl. No.: 770,306

[22] Filed: Feb. 22, 1977

[30] Foreign Application Priority Data

Feb. 19, 1976 [DE] Fed. Rep. of Germany ....... 2606782

[51] Int. Cl.² .......................... G02B 5/14; G02B 5/16; G02B 1/10; C03C 17/32
[52] U.S. Cl. .......................................... 427/163; 264/1
[58] Field of Search .............................. 427/163; 264/1

[56] References Cited

U.S. PATENT DOCUMENTS

| 3,301,648 | 1/1967 | Sheldon | 264/1 X |
| 3,480,458 | 11/1969 | Dislich et al. | 427/163 X |
| 3,623,903 | 11/1971 | Dislich et al. | 350/96 M X |
| 3,899,313 | 8/1975 | Grabmaier et al. | 427/163 X |
| 3,930,103 | 12/1975 | Chimura et al. | 427/163 X |
| 3,993,834 | 11/1976 | Chimura et al. | 428/373 |

*Primary Examiner*—James R. Hoffman
*Attorney, Agent, or Firm*—Hill, Gross, Simpson, Van Santen, Steadman, Chiara & Simpson

[57] ABSTRACT

A method more easily producing improved enveloped photoconducting fibers or cables which comprises coating the fibers of cable with a soft cast resin thus preventing fabricating stresses as well as mechanical forces imparted to the encapsulated fibers by the envelope according to the prior art. Preferably the fiber or bundle of fibers is first coated with a soft cast resin and then hardening said resin about said fiber or bundle of fibers by a chemical reaction to form a flexible and mechanically stable body.

10 Claims, No Drawings

METHOD OF PRODUCING OPTICAL CABLES

BACKGROUND OF THE INVENTION

1. Field of the Invention

The invention relates to optically transmissive elements.

2. Prior Art

Electrical cables are known and have many advantages in a variety of applications. Typical prior art electrical cables are produced, for example, by lamination, extrusion or calendering techniques or some other similar processes. While such methods are satisfactorily used in instances where such cables have metallic conductors therein, they are unsuitable when light conductors, such as optical fibers, are assembled into cables because the prior art production techniques produce different tensile or compressive stresses in the individual light conductive elements which adversely affect their light transmissive properties; for example, mechanical stresses on a light conductor may cause a breakage of the conductor or may cause an increase of the transmission dampening within such a conductor.

Optical cables which are embodied in the manner of electrical cables are known wherein a plurality of optical fibers are positioned next to one another in a parallel relation and are encased or enveloped between two interlaminated or interfused foils or sheets. The foils function as carriers for the optical fibers and can be further processed so as to form a cable in the form of an electrical cable. Since light transmissive elements within a cable or bundle tend to shift in their position relative to one another, lubricating agents have been applied between such optically transmissive elements in order to avoid mechanical damage to such elements. Typically, each individual optical element was coated with a protective layer which is flexible and has a relatively low coefficient of friction. A gel-type petroleum derivative has been used as a lubricating agent for optical element (British patent specification No. 1,423,590). However, such lubricating agents may be displaced from the optical element surface or from a bundle of such optical elements during the processing thereof or during usage of the final product so that whatever beneficial effect was imparted by the lubricating agent is lost.

SUMMARY OF THE INVENTION

The invention provides an improved method of enveloping at least one optical fiber element so that such fiber is flexible and the danger of breaking or mechanically stressing the encapsuled optical fiber is reduced to a minimum and the above prior art difficulties are avoided or at least minimized.

In accordance with the principles of the invention, optically transmissive elements are enveloped with a soft cast synthetic resin and then that resin is hardened about said fiber element by a chemical reaction to form a flexible and mechanically stable body. Such synthetic resins can be applied at relatively low processing temperatures and thereby avoid thermal and mechanical stresses on the optical elements. Soft cast synthetic resins are applied in a uncured state and chemically hardened in situ about the optical elements. The Shore hardness A is preferably 30 to 100 according to ASTM D 2240. Preferred soft synthetic resins used in the practice of the invention are selected from the group consisting of isocyanates, epoxides, unsaturated polyesters, silicones, ethylene derivatives and mixtures thereof. Soft synthetic resins may be formed into solid or foam-type bodies and may be filled with various coloring agents, such as dyes, pigments, etc., electrically conductive particles, electrical conductors as well as other elements for receiving mechanical forces. In addition, the optical elements may be coated with a lubricating and/or separating agent so as to be suspended thereby within the enveloping resin. In certain embodiments, such lubricating and separating agents comprise an optical immersion liquid which has an index of refraction substantially similar to that of the optical elements.

DESCRIPTION OF THE PREFERRED EMBODIMENTS

The invention provides a method of enveloping at least one optical fiber element with a soft cast synthetic resin so by chemical reaction at relatively low temperatures a hardened body is formed about such optical element and which is mechanically stable and flexible so that the danger of optical element breakage is kept at a minimum.

In accordance with the principles of the invention, the plastic material used to envelope optical elements is a soft cast synthetic resin. In developing the invention, the fact was considered that thermal stresses on optical fibers, produced, for example, during the extrusion of thermoplastic material, may cause an undesirable change in the optical and/or mechanical properties of the optical fibers. The use of cast resin as an envelope permits the use of relatively low processing temperatures (i.e., below about 100° C). Accordingly, production of optical cables with such cast resins should be extremely gentle on the glass or optical fibers because thermal contractions and the like can hardly occur during a cooling process and mechanical stresses cannot occur. The formation of mechanical stresses and the danger of fiber breakage as well as an increase of transmission dampening caused in this manner are thus, to a great extent, avoided.

Soft cast resins (sometimes referred to as soft resins) are such resins which, in a cured or hardened state, are flexible and exhibit a rubber-like elasticity, at least in layer thicknesses of up to a few millimeters. Soft resins useful in the practice of the invention are preferably selected from the group consisting of isocyanate resins, epoxy resins, unsaturated polyester resins, silicone resins, ethylene or ethylene derivative resins and mixtures thereof. Such soft resins are preferably formed into foam-type bodies containing the optical elements therein. Further, various coloring agents, conductive particles and other diverse filler materials may be incorporated within the soft resins in the practice of the invention.

In certain embodiments of the invention, lubricating and separating agents may be applied to the individual optically transmissive elements prior to application of a soft resin so that the optically transmissive elements (each being comprised of at least one optical fiber or a bundle of such fibers) are floatingly suspended or floatingly embedded within the soft resin envelope body.

During the production of an optical fiber or bundle of such fibers in accordance with the above embodiments, the optically transmissive elements are first coated with a thin continuous layer of a liquid or a paste-like mixture composed of a lubricating and/or separating material as for example polymethylsiloxan, polymethylphenylsiloxan, hydrocarbon or esteroil, which is relatively inert to the optical element and which adheres to the optical element during and after the application of the soft resins about the optical element in forming the optical cable. Such lubricating or separating layer insures that a rigid adherence between the optical elements and the mechanically stable envelope does not occur so that mechanical stresses, such as compression and/or shear forces are further avoided. Further, such a lubricating layer allows a length change, due to temperature changes, or mechanical stresses to occur within the cable with little, if any, resulting forces being transmitted to the optical elements so that undesirable effects, particularly undesirable dampening increases, are substantially avoided.

Optical cables may comprise individual light conductive fibers encased in a soft resin body or may comprise a bundle of such light conductive fibers encased in a soft resin body. The optical cables are flexible, substantially mechanically insensitive, and are easy to handle (approximately in the manner of an insulated metal strand conductor, i.e., an electrical cable). Further, optical fibers produced in accordance with the principles of the invention are mechanically processable, such as shearable or cuttable and are readily optically coupled to other optical bundles or other component parts.

In other embodiments of the invention, the above described lubricating and separating agents are so-selected as to function as an optical immersion liquid. In these embodiments, a liquid material having an index of refraction substantially similar to that of at least a core portion of the optically transmissive elements is utilized. In the event of a break in one or more optical elements within a cable containing such an immersion liquid, a certain amount of this liquid will infiltrate or seep into the gap produced by the breakage between portions of one or more optical elements so as to form an immersion fluid for the broken optical elements. In this manner, the light conductivity of a given optical transmission path is functionally maintained, even after a break occurs in an optical element.

In embodiments where separation agents are utilized in forming the optical cables of the invention, the exposure of individual optical element ends (which are required for packaging) is substantially facilitated.

In certain embodiments, filler elements such as graphite powder, metal powder, etc., and/or electrical conductors as well as other elements which are capable of receiving mechanical forces may be embedded, along with the optically transmissive elements, within the enveloping body comprised of a select soft cast resin. Optical cables containing pure graphite powder, metal powder or electrical conductors therein are electrically conductive as well as optically conductive and may be electrically insulated by applying an electrically insulating lacquer or resin layer on top of the soft resin layer or by extruding a thermoplastic layer onto such electrically conductive body having optical elements therein.

In instances where an electrically insulating layer is utilized, the insulating layer may carry indicia, such as a color or print, as an aid in marking the enveloped optical elements. The method in accordance with these embodiments is useful in producing flexible light-conductive element bundles which can easily be laid out for assembly and which are substantially insensitive to normal environmental conditions. Such optical cables permit the simultaneous transmissions of optical and electrical signals.

In proceeding along the principles of the invention, a cable bundle comprised of several light-conductive elements or an individual light-conductive element is charged or coated with a select soft resin which hardens on the optically transmissive element due to chemical reaction at a relatively low temperature to form a body or cover about such optical elements. The soft resin may be applied by immersing the optically transmissive elements in a resin bath or by spraying a soft resin onto such elements from a suitable nozzle, which may be receiving the sprayed resin from an operational mixing device or which may itself function as a mixing means. The so-applied soft resin is then chemically hardened about the optically transmissive element and forms a stable mechanical body about such element and provides protection against any damage.

In embodiments where a lubricating and separating agent is desired, such agents are typically applied before application of the soft resin. For example, a solution of silicone oil in ethyl acetate (a solvent for silicone oil) may be coated onto the optically transmissive elements, with at least a portion of the solvent being allowed to evaporate from the so-coated optical elements. Thereafter, the so-coated optical elements may be coated or powdered with talcum or the like. Further layers may be applied onto the talcum layer. When these method steps are carried out, a preferred solution viscosity is about 0.15 $N_s/m^2$. Preferably the talcum is not applied until after the solvent has substantially evaporated from the applied solution, since otherwise the soft resin applied as an outer coating would shrink and become discontinuous (i.e., form a droplet or the like) or run off of the surface of the optical element due to the low surface tension of the silicone oil.

An exemplary soft resin formulation comprises a mixture of 100 parts of an aliphatic polyol having an equivalent weight of 340 to 350, 24.6 parts of hexamethylene-1,6-diisocyanate and 0.1 to 0.5% of dibutyl tin dilaurate. A coloring agent, such as a dye or a pigment may also be incorporated within the above mixture. The above exemplary resin formulation may be applied to optical elements having a talcum coating thereon which is dry at least on the outer surface thereof, preferably by submerging such optical elements into a bath containing this resin formulation and then removing the optical elements with an adhering layer of resin thereon and curing or hardening such resin layer by chemical action at a temperature in the range of 50° to 100° C.

With the foregoing general discussion in mind, there is presented an illustrative example which will illustrate to those skilled in the art the manner in which the invention may be practiced. However, the example is not to be construed as limiting the scope of the invention in any way.

EXAMPLE

One or more optical fibers are wetted (moistened by liquid or pasty silicons (viscosity about 0.15 $Ns/m^2$) in this way: The optical fibers are vertically suspended in or moved through a container containing said silicons. After evaporating of the solvent (for example ethyl acetate, trichloroethylene, benzine) the remaining cover of silicon is overlayed by powders, for example talc, slate, mica, graphite, or powdery organic materials, for example starchflour. The optical fiber prepared in this way is then covered by immersing it into soft cast resin or casting soft cast resin over it.

FORMULATION A

An intermixture of 50 grams of aliphatic diisocyanate having an equivalent weight of 100 to 110 grams with 163 grams of an aliphatic polyol having an equivalent weight of 340 to 350 grams was prepared so as to obtain a viscosity of 300 to 500 mNs/m$^2$ and 0.4 grams of dibutyl tin dilaurate was added to obtain a soft cast resin material useful in the practice of the invention.

FORMULATION B

A soft cast resin mixture was prepared by intermixing 50 grams of an aromatic diisocyanate having an equivalent weight of 130 to 140 grams, with 120 grams of an aliphatic polyol having an equivalent weight of 340 to 350 grams to obtain a viscosity of 300 to 500 mNs/m$^2$ and 0.04 grams of dibutyl tin dilaurate was added to obtain a resin mixture useful in the practice of the invention.

FORMULATION C

A soft cast resin mixture was prepared by intermixing 50 grams of an aromatic diisocyanate having an equivalent weight of 130 to 140 grams with 105 grams of a glycerine-ricinoleic acid triester and 0.04 dibutyl tin dilaurate.

FORMULATION D

A soft cast resin mixture was prepared by intermixing 50 grams of diphenylmethane-4,4'-diisocyanate (having a purity of about 95%) with 140 to 150 grams of polyether-polyester-polyol having an equivalent weight of 340 to 350 grams to obtain a viscosity of 500 to 3500 mNs/m$^2$ and 0.1 gram of dibutyl tin dilaurate was then added.

The above resin formulations (FORMULATION A through FORMULATION D) were hardened about the optically transmissive elements by controllably heating the resin-coated elements at a temperature of about 60° to 80° C.

In a further embodiment of the invention, select optical elements are properly positioned and enveloped in a select soft resin so that a hardened foam-type sleeve forms about the optical elements. The resultant foam structure (having optical elements enveloped therein) may then be soaked in a liquid which is relatively inert to the hardened resin and which has a very low vapor pressure and an index of refraction similar to that of the optical elements within the foam structure. This type of liquid as for example silicone oil, hydrocarbon oil or oils comprising brominated or nitrided aromatic groups permeates the foam structure and functions as a lubricating agent and an optical immersion liquid which can seep into breaks or fractures that may occur within individual optical elements and render such breaks or the like practically harmless.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as is set forth and defined in the hereto-appendant claims.

I claim as my invention:

1. A method of enveloping at least one optical fiber element by first enveloping such fiber element with a continuous layer of a soft cast synthetic resin and then hardening said resin about said fiber element by a chemical reaction to form a flexible and mechanically stable optical body.

2. A method as defined in claim 1 wherein said soft cast synthetic resin is a material hardenable by chemical reaction at relatively low temperatures and is selected from the group consisting of isocyanates, epoxides, unsaturated polyesters, silicones, ethylene derivatives and mixtures thereof.

3. A method as defined in claim 2 wherein said soft cast synthetic resin forms a foam-type sleeve about said optical fiber element.

4. A method as defined in claim 3 including soaking the foam-type body having enveloped therein said optical fiber element in a liquid which is substantially inert to said body and which has a very low vapor pressure and an index of refraction substantially similar to that of said optical fiber element.

5. A method as defined in claim 1 wherein, prior to enveloping the optical fiber element within the soft cast synthetic resin, said optical fiber element is coated with a relatively thin continuous layer of a material having sufficient viscosity to maintain the continuity of such layer when another layer is applied on top of such continuous layer.

6. A method as defined in claim 5 wherein said optical fiber element, prior to envelopment within the soft cast synthetic resin, is coated with a layer of a solution consisting of silicone oil in ethyl acetate, evaporating at least a portion of the ethyl acetate after application and applying a layer of talcum onto the so-coated optically transmissive elements.

7. A method as defined in claim 6 including applying a lubricating and separating layer onto the talcum layer.

8. A method as defined in claim 1 wherein a material selected from the group consisting of metal powder and graphite powder is intermixed with the soft cast synthetic resin and said optical fiber element is enveloped within such resin-material mixture.

9. A method as defined in claim 8 including applying an electrically insulating layer on top of the body composed of hardened resin-material mixture having the optical fiber element therein.

10. A method as defined in claim 9 including placing an indicia on the electrically insulating layer for identifying the optical fiber element within the resultant body.

* * * * *